(12) United States Patent
Swami et al.

(10) Patent No.: US 7,856,467 B2
(45) Date of Patent: Dec. 21, 2010

(54) INTEGRATED CIRCUIT INCLUDING AT LEAST ONE CONFIGURABLE LOGIC CELL CAPABLE OF MULTIPLICATION

(75) Inventors: Parvesh Swami, New Delhi (IN); Ankur Bal, Uttar Pradesh (IN)

(73) Assignee: STMicroelectronics PVT. Ltd., Uttar Pradesh (IN)

( * ) Notice: Subject to any disclaimer, the term of this patent is extended or adjusted under 35 U.S.C. 154(b) by 1356 days.

(21) Appl. No.: 11/324,019

(22) Filed: Dec. 29, 2005

(65) Prior Publication Data

US 2006/0195503 A1    Aug. 31, 2006

(30) Foreign Application Priority Data

Dec. 29, 2004    (IN)    ................ 2591/DEL/2004

(51) Int. Cl.
    *G06F 7/52*    (2006.01)
(52) U.S. Cl. .................................... 708/625
(58) Field of Classification Search ............... 708/230, 708/625; 326/38, 39
    See application file for complete search history.

(56) References Cited

U.S. PATENT DOCUMENTS

| 6,384,627 B1 * | 5/2002 | Fross et al. | 326/39 |
| 6,847,228 B1 * | 1/2005 | Crotty et al. | 326/38 |
| 7,193,433 B1 * | 3/2007 | Young | 326/38 |

* cited by examiner

Primary Examiner—Chuong D Ngo

(57) ABSTRACT

The present invention provides an integrated circuit including at least one configurable logic cell capable of multiplication comprising an addition means for adding a first input and a partial product; a first multiplexing means for receiving a first output of said addition means at its first input and said partial product at its second input with its select line being controlled by second input, said first multiplexing means providing a first output; and a second multiplexing means for receiving a second output of said addition means at its first input and said second input at its second input with its select line being coupled to said second input, said second multiplexing means providing a second output.

20 Claims, 4 Drawing Sheets

INTEGRATED CIRCUIT INCLUDING AT LEAST ONE CONFIGURABLE LOGIC CELL CAPABLE OF MULTIPLICATION

TECHNICAL FIELD OF THE INVENTION

This invention relates to an integrated circuit including at least one configurable logic cell capable of multiplication.

BACKGROUND OF THE INVENTION

Multiplication of binary numbers is a common requirement in implementing various functions using Programmable Logic Devices (PLD). It is therefore desirable to have an efficient and fast multiplication capability. Neither the configurable logic cells of existing designs of PLDs are designed for multiplication nor are the multiplication schemes proposed according to PLD architectures. This limitation is described in context of the complete multiplication process outlined below.

In the basic binary multiplication process, each bit of the multiplier beginning with the Least Significant bit (LSB) is examined in turn. If the multiplier bit is a "1", the current value of the multiplicand is added to the partial product result. If the multiplier bit is a "0", then the current value of the multiplicand is not added to the result. After each addition step, the multiplicand is shifted left by one bit in preparation for the next operation. The multiplication may either be carried out serially for each bit, or in parallel for all bits simultaneously. In a PLD, the conditional sum and multiplicand shifting are carried out by an array of interconnected logic cells, each of which operates on a single bit of the multiplicand and a single bit of the multiplier. The condition check of the multiplicand in a logic cell is achieved by an AND function and the addition operation is performed by a 1-bit Full Adder.

The basic multiplication operation therefore requires the output of the ANDing of the multiplicand and the multiplier to be added to the input carry and the input partial product. The output from the multiplication of the multiplicand by each bit of the multiplier except the final bit multiplication is termed as "Partial Product". The 1-bit Full Adder receives a 1-bit carry input from the previous bit stage in the same bit multiplication as an addition input and also generates a 1-bit carry output for the next stage. Each bit multiplication extends over multiple multiplier "cells" with each cell providing product of a single bit of the multiplicand with a single bit of the multiplier. A "row" of such multiplier cells provide "Partial Product" of the multiplicand with one bit of the multiplier.

In parallel multipliers, a plurality of rows (as many as the number of bits in the multiplicand) is connected in a cascade manner. The "Partial Product" output from a row is connected to the input of the next row in a bit-shifted fashion to form a 2-dimensional matrix of cells. For providing optimal speed of operation, it is essential to minimize circuit delays in the path of both the partial product term and the carry input and carry output terms.

The "basic cell" of a parallel multiplier consists of an AND gate receiving one bit of the multiplier and the multiplicand at its input, and its output is coupled to a 1-bit full adder. The full adder also receives the partial product from the previous stage and the carry input from the previous bit position. The output of the full adder serves as the partial product for the next stage or as product bit of the final binary product. The multiplication of one bit of the multiplier with all the bits of the multiplicand results in the generation of partial product output that forms the input for the multiplication of the next bit of the multiplier with the shifted value of the multiplicand.

FIG. 1 shows the block diagram of a parallel multiplier illustrating the cascaded arrangement of cells. The multiplier array 1.1 comprises of multiple individual Configurable Logic Cells (CLCS) 1.2 interconnected in a staggered row and column matrix. The multiplicand 1.3 provides the bit inputs for the columns of the matrix while the multiplier 1.4 provides the bit inputs for the rows of the matrix. Each CLC 1.2 receives a single multiplicand bit input 1.5, a single multiplier bit input 1.6, a Partial Product bit input 1.9 and a Carry-In bit input 1.7. Each multiplier bit is connected to the multiplier bit inputs of all the CLCs in a row i.e. multiplier bit 1.6 is connected to all the CLC's 1.2 of the first row. Each multiplicand bit is connected to the multiplicand bit inputs of CLCs in a bit-shifted manner, precisely, multiplicand bit 1.5 is connected to first CLC's of all the rows which in turn are shifted one position from the previous CLC. Each CLC provides two outputs, a Partial Product output 1.10 and a Carry Out bit 1.8. The Partial Product Output 1.10 is connected to the partial Product Input 1.9 of the CLC of the subsequent row in the same column while the carry out 1.8 is connected to the Carry In 1.7 of the adjacent CLC on the left in the same row. The output can be tapped from the output terminals 1.11 to 1.n.

FIG. 2 shows the internal functional structure of a single CLC 2.1 in multiplication mode. A multiplicand bit 2.2 and a multiplier bit 2.3 are connected to the two inputs of a two-input AND gate 2.8. The output of the AND gate provides the conditional addition input 2.10 of the multiplicand to one input of one-bit Full Adder 2.9. The other input of the Full Adder is connected to Partial Product input bit 2.5. The Full Adder 2.9 computes the Partial Product output bit 2.6, which is the sum of Partial Product input 2.5, Carry In 2.4 and conditional multiplicand bit input 2.10, and also generates a Carry Out bit 2.7.

The aforesaid structure requires two CLBs for its implementation in a FPGA as one CLB is utilized for implementing a full adder while the other is utilized for implementing AND gate functionality. Thus lot of hardware is involved for multiplying two bits.

A multiplier structure is required to utilize PLD resources efficiently and a CLC is thus desired that efficiently implements the basic multiplier cell without the introduction of overheads in hardware. The proposed method implements the multiplier without using AND gate at the input of Adder. Further the proposed multiplier cell can be directly implemented in a CLC by the mapping the full adder and a partial product generator in a single CLC.

The proposed CLC architecture can be implemented in United States Patent Publication No. 2002/0116426 entitled "Look-up table apparatus to perform two-bit arithmetic operation including carry generation".

SUMMARY OF THE INVENTION

To address the above-discussed deficiencies of the prior art, an object of the instant invention is to provide a multiplication structure providing enhanced performance for multiplication operation consisting of a plurality of CLC.

Another object of the invention is to implement the basic multiplier cell in a CLC without the introduction of overheads in hardware.

To achieve the aforesaid objects the instant invention provides an integrated circuit including at least one configurable logic cell capable of multiplication comprising:

an addition means for adding a first input and a partial product;

a first multiplexing means for receiving a first output of said addition means at its first input and said partial product at its second input with its select line being controlled by second input, said first multiplexing means providing a first output; and a second multiplexing means for receiving a second output of said addition means at its first input and said second input at its second input with its select line being coupled to said second input, said second multiplexing means providing a second output.

Said addition means include a full adder.

Said addition means include a LUT based apparatus.

Said first multiplexing means include a multiplexer.

Said second multiplexing means include a multiplexer.

Said first input is a multiplicand.

Said second input is a multiplier.

Said first output is a partial product output.

Said second output is a carry out.

Said integrated circuit includes a programmable logic device.

Said integrated circuit includes a FPGA.

In a programmable look up table apparatus wherein the configurable logic cell of is employed to enhance multiplication operation substantially as herein described with reference to FIG. 3 of the accompanying drawings.

A method for multiplication comprising the steps of:

adding a first input and a partial product;

multiplexing a first output of addition means and said partial product depending upon a second input; and multiplexing a second output of said addition means and said second input depending upon said second input.

Said first input is a multiplicand.

Said second input is a multiplier.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The invention will now be described with reference to the accompanying drawings, in which like reference numerals represent like parts, and in which.

DETAILED DESCRIPTION

Figure 1:
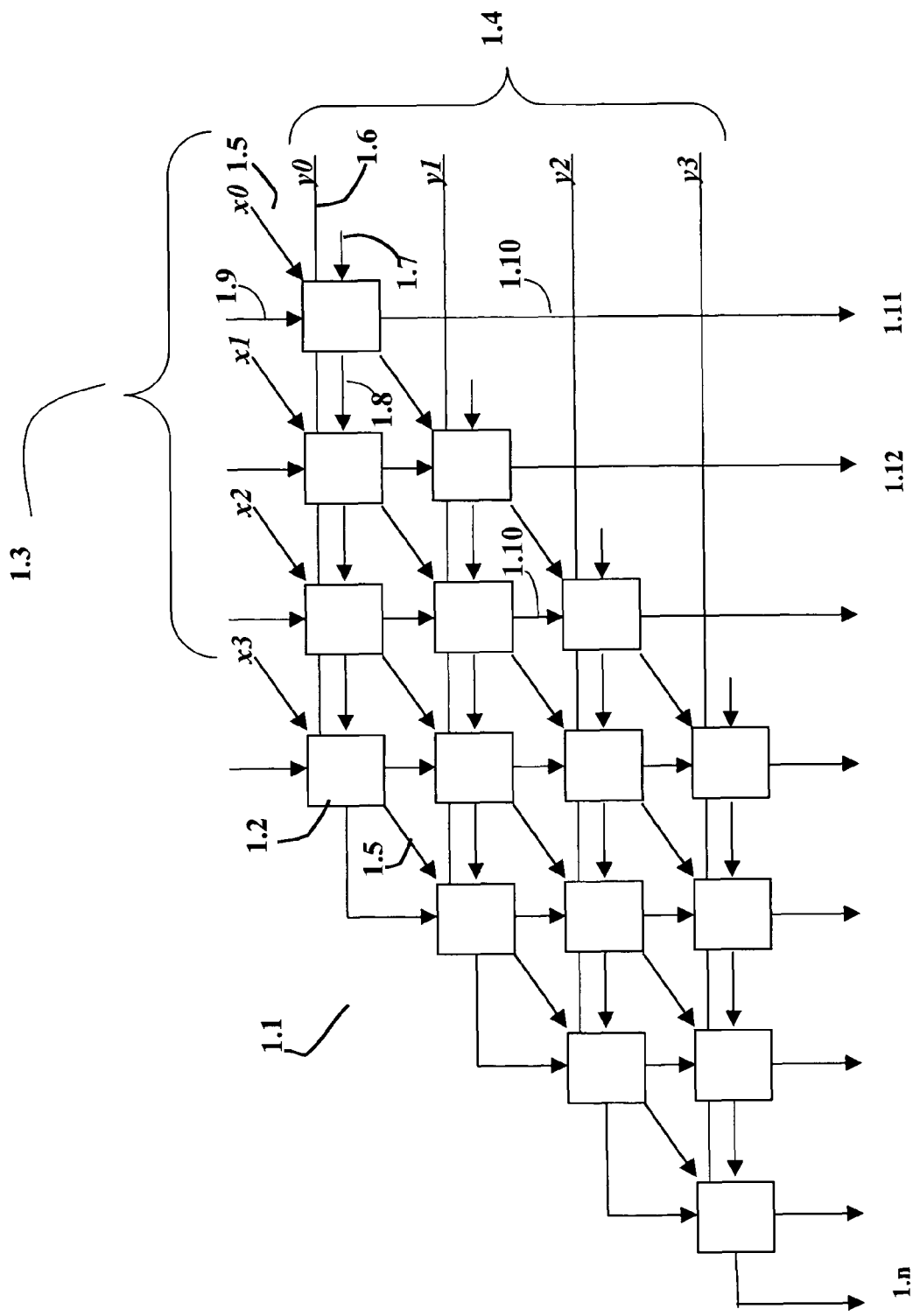
FIG. 1 shows the block diagram of a parallel multiplier illustrating the cascaded arrangement of cells.
Figure 2:
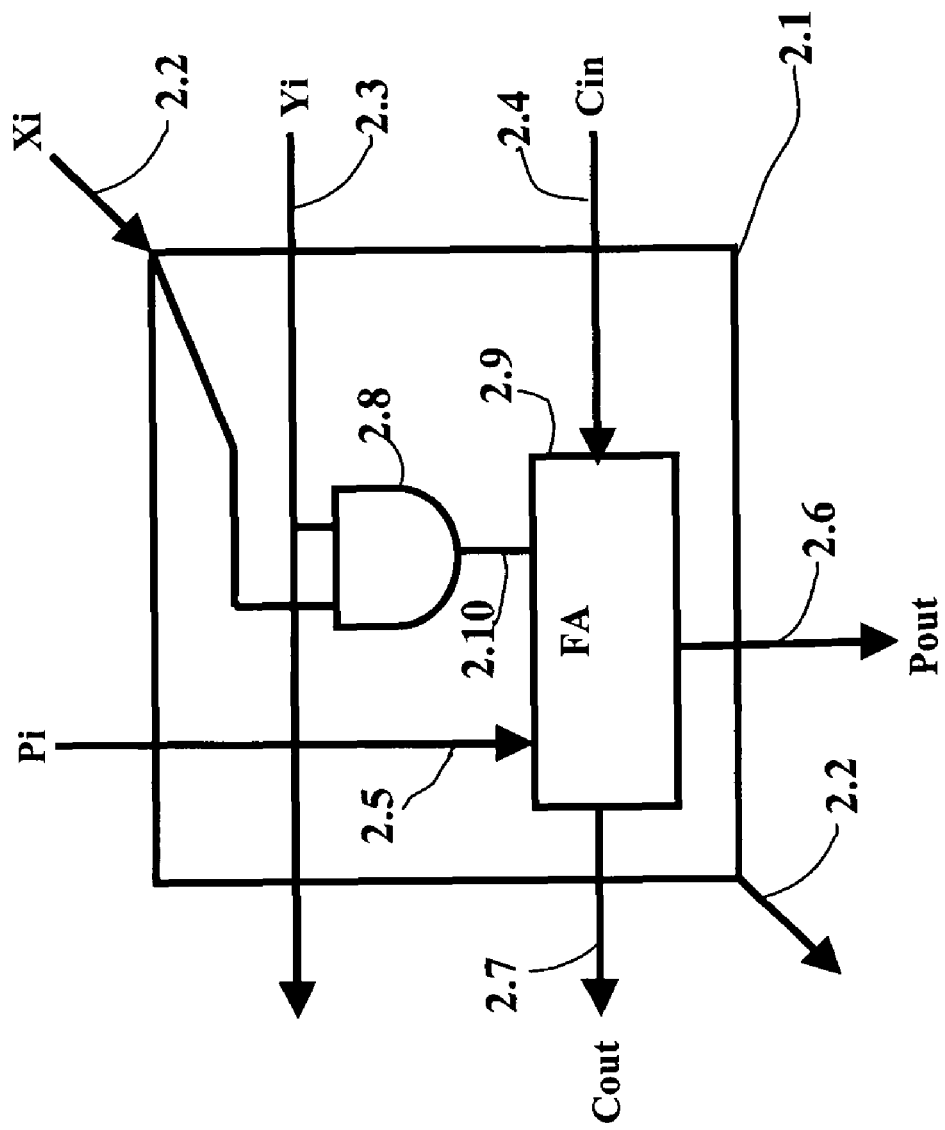
FIG. 2 shows the internal functional structure of a single CLC in multiplication mode according to prior art.
Figure 3:
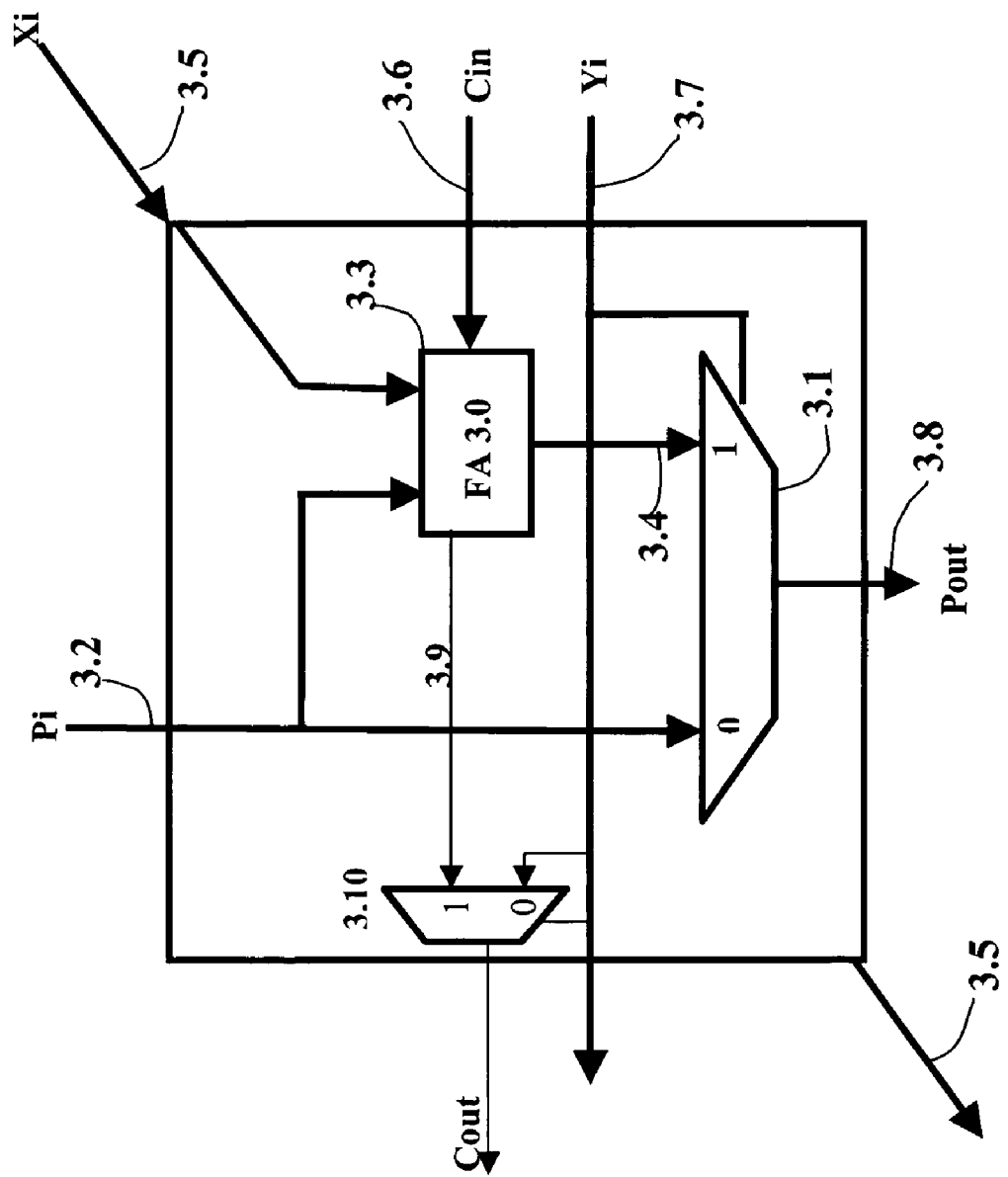
FIG. 3 illustrates a basic multiplier cell in accordance with the invention.
Figure 4:
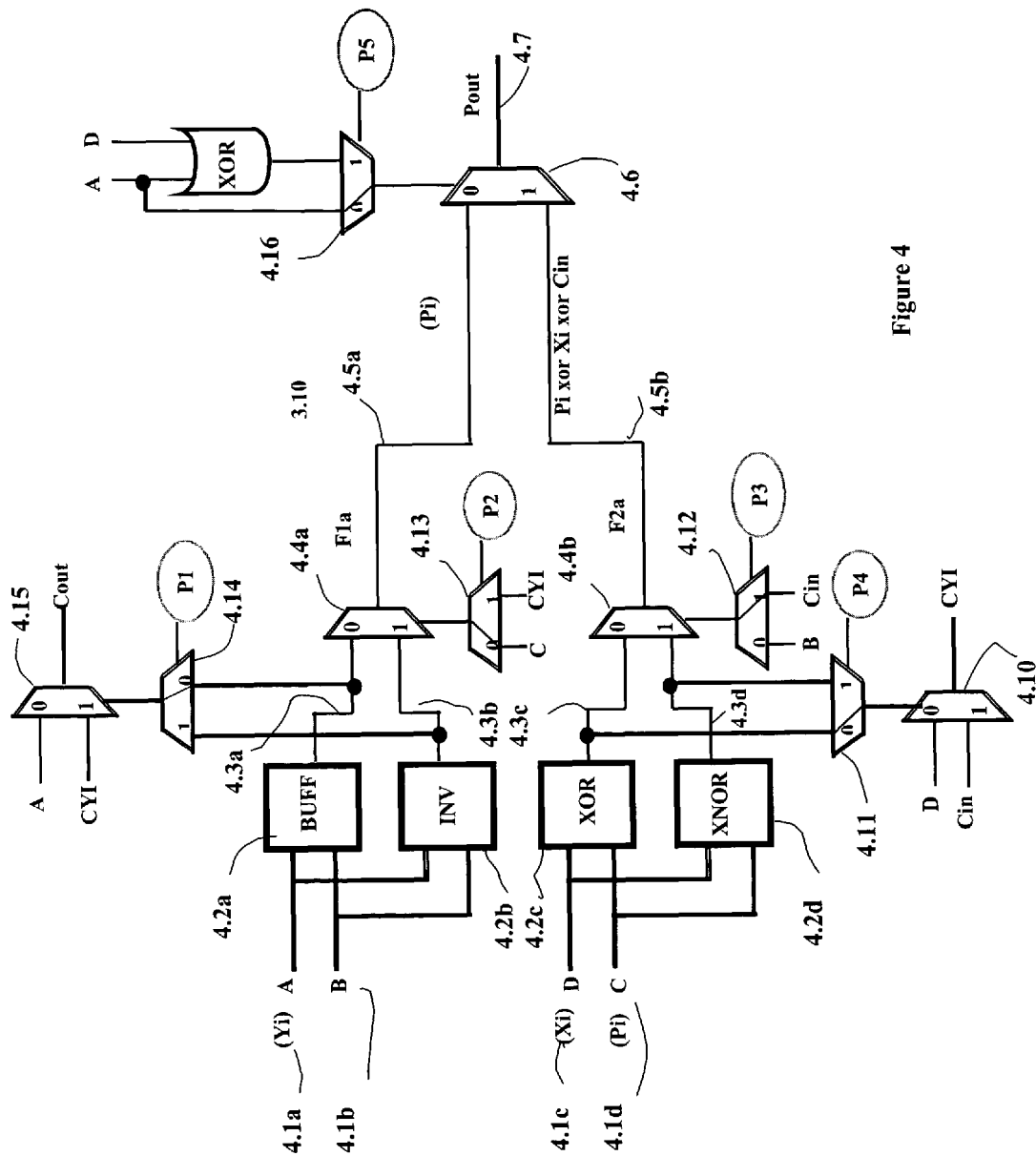
FIG. 4 shows multiplication cell implementation in CLC architecture of the US patent publication number 20020116426.

FIGS. 2 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated circuit.

The proposed invention integrates the partial product generator with the full adders required to implement a multiplication operation. The cell of FIG. 2 can be quantitatively looked upon as a block (multiplier) that transmits either a partial product from a previous cell, or the sum of the previous partial product and the current partial product.

FIG. 3 illustrates an alternative to the basic multiplier cell described previously (FIG. 2). The proposed block is tailored to match the CLC architecture without the addition of any extra hardware (AND gate, etc). As will be appreciated by those skilled in the art, the functionality demonstrated by the proposed multiplier cell of FIG. 3 is identical to that of the more conventional FIG. 2. The AND gate and Full Adder combination has been replaced by a two input multiplexer 3.1 and a Full Adder 3.3. The multiplexer 3.1 inputs comprise Pi (Partial product in) 3.2 and Full Adder out 3.4. The Full Adder has the multiplicand bit 3.5, a partial product bit from a previous stage 3.2, and a carry in 3.6 from the adjacent CLC incident on its inputs. The partial product out 3.8 is an input for the next stage and is generated by a multiplier bit 3.7 that controls the multiplexer.

When the multiplier bit 3.7 is logic 1, the partial product output 3.8 is summation of partial product input 3.2, multiplicand 3.5 and carry input 3.6 from previous stage while carry out receives Full Adder carryout 3.9.

When the multiplier bit 3.7 is logic 0 the partial product input 3.2 is passed on to partial product 3.8 while the carry out receives logic 0 through multiplexer 3.10.

The multiplier cell topology of FIG. 3 can be mapped to a CLC structure delineated in FIG. 4. The CLC is basically a four input Look Up Table (LUT) with enhanced features for efficient implementation of arithmetic operations. As will be appreciated by those skilled in the art, the CLC in FIG. 4 has the necessary components for implementing any four input function. Four of 2 input LUTs 4.2a, 4.2b. 4.2c & 4.2d are coupled via two stage multiplexing. The LUTs 4.2 are paired and their inputs 4.1a, 4.1b, 4.1c & 4.1d are pooled to give rise to a total of four inputs to the LUT. The paired LUT outputs 4.3a & 4.3b are selected by a first stage two input multiplexer 4.4a controlled by one of the LUT inputs. Similarly, the other paired LUT outputs 4.3c & 4.3d are selected by a first stage two input multiplexer 4.4b controlled by one of the LUT inputs The first stage multiplexers 4.4a & 4.4b outputs 4.5a & 4.5b are directed to a second stage multiplexer 4.6 whose control line is a logical XOR of two of the LUT inputs 4.1a & 4.1c. It can be easily verified by those skilled in the art that the final output 4.7 is equivalent to that of a four input LUT. To avoid overcomplicating the disclosure and thereby obscuring the present invention a four input LUT function is not described in detail herein. A four input LUT according to the present invention is disclosed in United States Patent Publication No. 2002/0116426 entitled "Look-Up Table Apparatus To Perform Two-Bit Arithmetic Operation Including Carry Generation" and hereby incorporated by reference.

Additional multiplexers 4.10, 4.11, 4.12, 4.13, 4.14 and 4.15 are introduced in the CLC structure to manage addition, subtraction, and multiplication from the CLC without the introduction of any major area or delay overheads. The role of these multiplexers will become apparent in the imminent description. To avoid overcomplicating the disclosure and thereby obscuring the present invention an addition or subtraction function is not described in detail herein. An addition function according to the present invention is disclosed in United States Patent Publication No. 2002/0116426 entitled "Look-Up Table Apparatus To Perform Two-Bit Arithmetic Operation Including Carry Generation" and hereby incorporated by reference.

In order to map a multiplier cell into the CLC, a Full Adder should be realizable in the given CLC structure. Referring to FIG. 4, a pair of two input sub LUTs 4.2c & 4.2d can be programmed to function as two input XOR and XNOR gates. Xi and Pi signals are applied to the inputs D & C of LUT. A multiplexer 4.11 is configured to propagate XOR from the sub LUT 4.2c output to a carry generation multiplexer 4.10 that selects the previous carry Cin or one of the sub LUT inputs 4.1c as carry in for the next stage. Depending on Cin, the sum F2a is selected as an XOR or XNOR of the two inputs Xi and Pi via another multiplexer 4.12. To avoid overcomplicating the disclosure and thereby obscuring the present invention an addition or subtraction function is not described in detail herein. An addition function according to the present invention is disclosed in United States Patent Publication No. 2002/0116426 entitled "Look-Up Table Apparatus To Perform Two-Bit Arithmetic Operation Including Carry Generation" and hereby incorporated by reference.

The second part of the multiplier cell of FIG. 3 includes a two input multiplexer 3.1. The inputs to this multiplexer are the Full Adder output and the partial product input from the previous stage Pi. Referring to FIG. 4, another pair of sub LUTs 4.2a & 4.2b is configured as a buffer and inverter respectively to an input A of LUT on which input signal Yi is applied. The other input B of LUT is treated as don't care type input. The buffer configured sub LUT is wired via multiplexer 4.14 to control another multiplexer 4.15 that puts Yi on the carry chain if Yi equals 0, or else propagates the previous carry to the next stage. Such an arrangement is mandatory as it prevents carry propagation when the multiplicand Yi is zero.

The partial product from the previous stage Pi is wired via multiplexer 4.13 to control another multiplexer 4.4a. The net effect is a Pi at the output of 4.4a, when Yi is zero and Pi is desired as the final output. The partial product output of the multiplier cell for the next stage is available at the output of multiplexer 4.6 that is controlled by Yi via multiplexer 4.16.

So, whenever Yi is logic 1, Pout will be 4.5b, which is a summation output of Xi, Pi & Cin while Cout will be CYI carry output of Xi, Pi & Cin. Similarly when Yi is logic 0, Pout will be 4.5a, which is Pi only, and Cout will be Yi, which is logic 0.

As will be appreciated by those skilled in the art, the CLC architecture delineated in FIG. 4 can be configured to accommodate the basic multiplier cell topology. A PLD architecture comprising the proposed CLCs can thus accommodate an N bit multiplier in $N^2$ number of CLCs.

What is claimed is:

1. An integrated circuit including at least one configurable logic cell capable of multiplication comprising:
   an addition means for adding a first input and a partial product;
   a first multiplexing means for receiving a first output of said addition means at its first input and said partial product at its second input with its select line being controlled by second input, said first multiplexing means providing a first output; and
   a second multiplexing means for receiving a second output of said addition means at its first input and said second input at its second input with its select line being coupled to said second input, said second multiplexing means providing a second output.

2. The integrated circuit of claim 1, wherein said addition means includes a full adder.

3. The integrated circuit of claim 1, wherein said addition means includes a look-up-table-based apparatus.

4. The integrated circuit of claim 1, wherein said first multiplexing means includes a multiplexer.

5. The integrated circuit of claim 1, herein said second multiplexing means include a multiplexer.

6. The integrated circuit of claim 1, wherein said first input is a multiplicand.

7. The integrated circuit of claim 1, wherein said second input is a multiplier.

8. The integrated circuit of claim 1, wherein said first output is a partial product output.

9. The integrated circuit of claim 1, wherein said second output is a carry out.

10. The integrated circuit of claim 1, wherein said integrated circuit includes a programmable logic device.

11. The integrated circuit of claim 1, wherein said integrated circuit includes a FPGA.

12. A method for multiplication in an integrated circuit including at least one configurable logic cell comprising the steps of:
   adding a first input and a partial product using an addition means;
   multiplexing a first output of the addition means and said partial product depending upon a second input; and
   multiplexing a second output of said addition means and said second input depending upon said second input.

13. The method of claim 12, wherein said first input is a multiplicand.

14. The method of claim 12, wherein said second input is a multiplier.

15. The method of claim 12, wherein said adding is performed using a full adder.

16. The method of claim 12, wherein said adding is performed using a look-up-table-based apparatus.

17. The method of claim 12, wherein said first output is a partial product output.

18. The method of claim 12, wherein said second output is a carry out.

19. A programmable logic device implementing an N-bit multiplier having N configurable logic cells, each cell comprising:
   an addition means for adding a first input and a partial product;
   a first multiplexing means for receiving a first output of said addition means at its first input and said partial product at its second input with its select line being controlled by second input, said first multiplexing means providing a first output; and
   a second multiplexing means for receiving a second output of said addition means at its first input and said second input at its second input with its select line being coupled to said second input, said second multiplexing means providing a second output.

20. The programmable logic device of claim 19, wherein the first output is a partial product output and the second output is a carry out.

* * * * *